(12) United States Patent
Yokota

(10) Patent No.: US 12,684,462 B2
(45) Date of Patent: Jul. 14, 2026

(54) WIRELESS COMMUNICATION SYSTEM FOR AUTOMATIC CREDENTIAL SHARING AND COMMUNICATION APPARATUS THEREOF

(71) Applicant: CANON KABUSHIKI KAISHA, Tokyo (JP)

(72) Inventor: Kazuyuki Yokota, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 18/181,248

(22) Filed: Mar. 9, 2023

(65) Prior Publication Data

US 2023/0300724 A1     Sep. 21, 2023

(30) Foreign Application Priority Data

Mar. 18, 2022     (JP) .................................. 2022-043730

(51) Int. Cl.
*H04W 48/10*          (2009.01)
*H04W 12/06*          (2021.01)

(52) U.S. Cl.
CPC ........... *H04W 48/10* (2013.01); *H04W 12/06* (2013.01)

(58) Field of Classification Search
CPC .............................. H04W 12/06; H04W 48/10
See application file for complete search history.

(56) References Cited

U.S. PATENT DOCUMENTS

| | | | | |
|---|---|---|---|---|
| 2007/0186105 A1* | 8/2007 | Bailey | ................. | H04L 63/0492 |
| | | | | 713/168 |
| 2015/0079939 A1* | 3/2015 | Naka | ..................... | H04W 12/04 |
| | | | | 455/411 |
| 2016/0182624 A1* | 6/2016 | Liang | ..................... | H04L 12/12 |
| | | | | 709/228 |
| 2016/0286343 A1* | 9/2016 | Terashita | ................ | H04W 4/80 |
| 2017/0006166 A1* | 1/2017 | Sumiuchi | ............ | H04L 12/4604 |
| 2017/0063807 A1* | 3/2017 | Cheng | ..................... | H04L 63/08 |
| 2018/0241628 A1* | 8/2018 | Hosoda | ............... | H04L 41/0816 |
| 2019/0265922 A1* | 8/2019 | Ikeda | ..................... | G06F 3/1203 |
| 2019/0364497 A1* | 11/2019 | Hu | ......................... | H04W 12/03 |
| 2020/0044820 A1* | 2/2020 | Kadota | ............... | H04L 63/0428 |
| 2021/0256222 A1* | 8/2021 | Marinovic | ............. | H04W 4/80 |
| 2023/0093016 A1* | 3/2023 | Shi | .......................... | H04L 41/12 |
| | | | | 370/329 |

FOREIGN PATENT DOCUMENTS

JP          2019219879 A     12/2019

* cited by examiner

*Primary Examiner* — Jeong S Park
(74) *Attorney, Agent, or Firm* — Canon U.S.A., Inc. IP Division

(57)          ABSTRACT

A communication system includes a communication apparatus configured to provide an access point connectable using a first service set identifier (SSID) and a password, and a communication terminal configured to perform wireless direct connection with the communication apparatus, wherein the communication apparatus broadcasts a beacon including a second SSID generated based on at least the first SSID and the password, and wherein the communication terminal receives the beacon, acquires the first SSID and the password based on the second SSID, and transmits a connection request to the access point.

9 Claims, 13 Drawing Sheets

_150_

*500*

| | SSID | PASSWORD | IP ADDRESS |
|---|---|---|---|
| INTERNAL ACCESS POINT | ABCDEFG | 123 | aaa.bbb.ccc.ddd |
| EXTERNAL ACCESS POINT | HIJKLMN | 456 | eee.fff.ggg.hhh |

*501*   *502*   *503*   *504*

BEACON FRAME (MANAGEMENT FRAME)                                    *550*

| | FRAME BODY ~551 |
|---|---|

FRAME BODY

| | SSID ~552 |
|---|---|

ABCDEFG_123_aaa.bbb.ccc.ddd

*800*

WIRELESS COMMUNICATION SYSTEM FOR AUTOMATIC CREDENTIAL SHARING AND COMMUNICATION APPARATUS THEREOF

BACKGROUND

Field

The present disclosure relates to a communication system and a communication apparatus.

Description of the Related Art

In recent years, an image processing apparatus (image forming apparatus) that includes a print function and a scan function and supports wireless local area network (LAN) communication has been widely spread. Japanese Patent Application Laid-Open No. 2019-219879 discusses a technique to exchange connection information such as a service set identifier (SSID) and a password by using near field communication (NFC) in order to simplify wireless connection setting in such an image forming apparatus supporting wireless LAN.

An information processing apparatus discussed in Japanese Patent Application Laid-Open No. 2019-219879 acquires the connection information (SSID and password) for an access point by using the NFC. Therefore, to connect the access point by using the method, the information processing apparatus is required to support the NFC, which leads to increase in cost of the apparatus.

SUMMARY

The present disclosure is directed to an image forming apparatus that can simply establish connection relationship between an information processing apparatus and the image forming apparatus with a simple configuration without using other circuits such as the NFC.

According to an aspect of the present disclosure, a communication system includes a communication apparatus configured to provide an access point connectable using a first service set identifier (SSID) and a password, and a communication terminal configured to perform wireless direct connection with the communication apparatus, wherein the communication apparatus broadcasts a beacon including a second SSID generated based on at least the first SSID and the password, and wherein the communication terminal receives the beacon, acquires the first SSID and the password based on the second SSID, and transmits a connection request to the access point.

Further features of the present disclosure will become apparent from the following description of exemplary embodiments with reference to the attached drawings.

3B is a block diagram illustrating a software configuration of the information processing apparatus.

Figure 4:
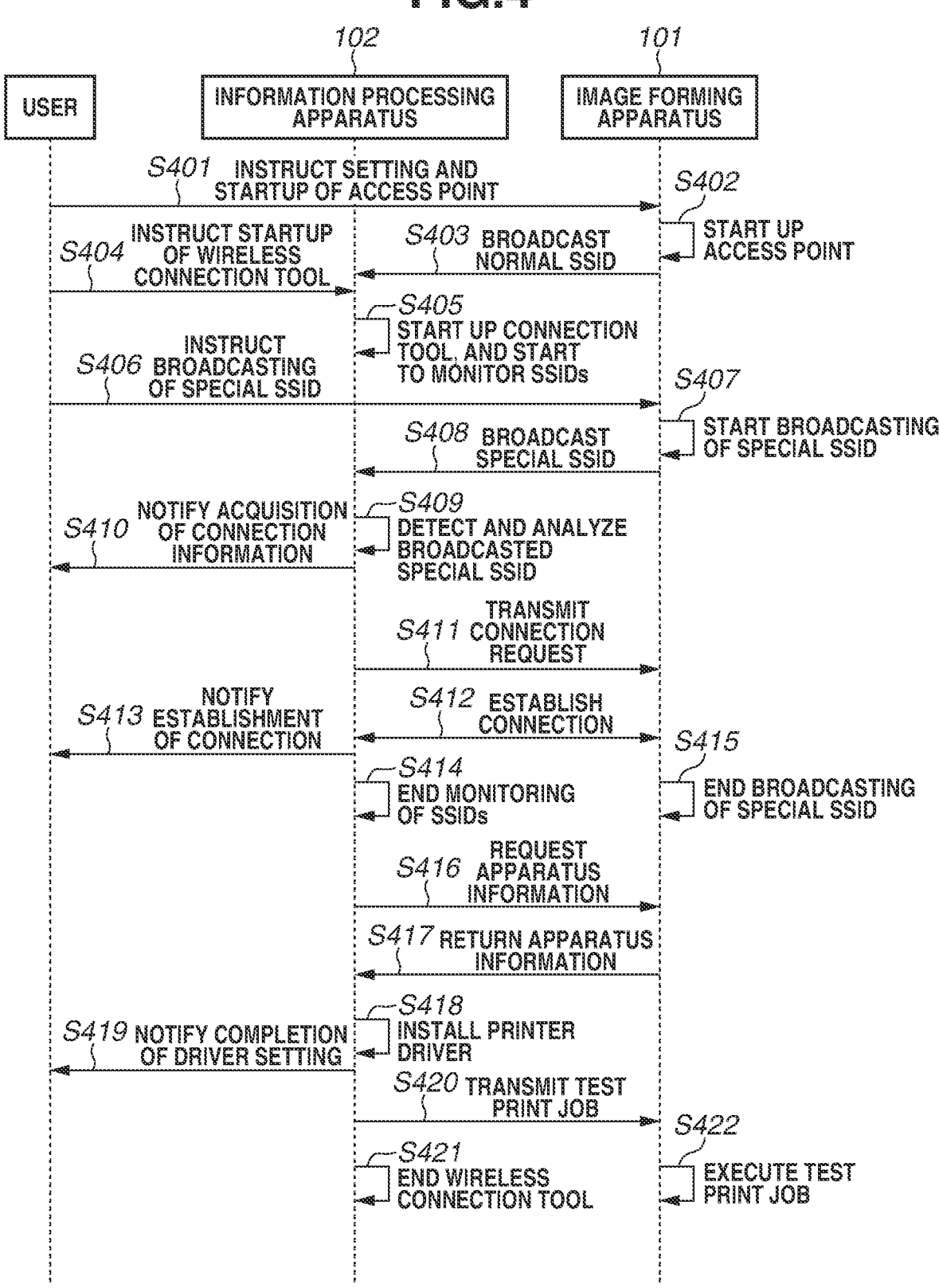

FIG. 4 is a diagram illustrating a usage sequence of the system according to the first exemplary embodiment.

Figures 5A, 5B:
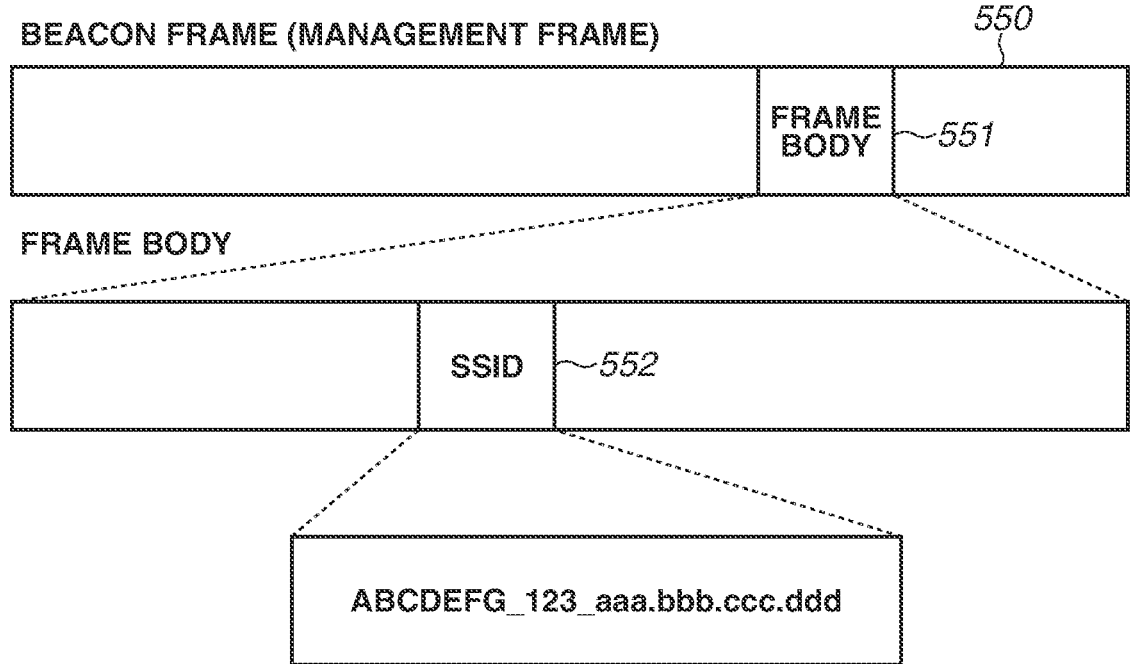

FIG. 5A is a diagram illustrating an example of connection information, and FIG. 5B is a diagram illustrating a beacon frame.

Figure 6A:
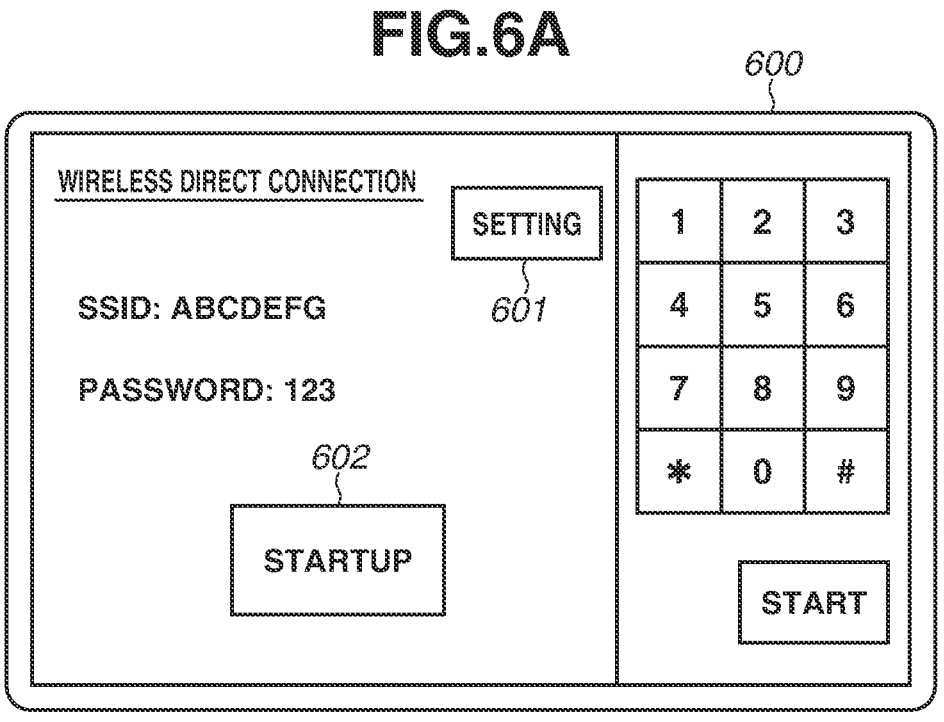
Figure 6B:
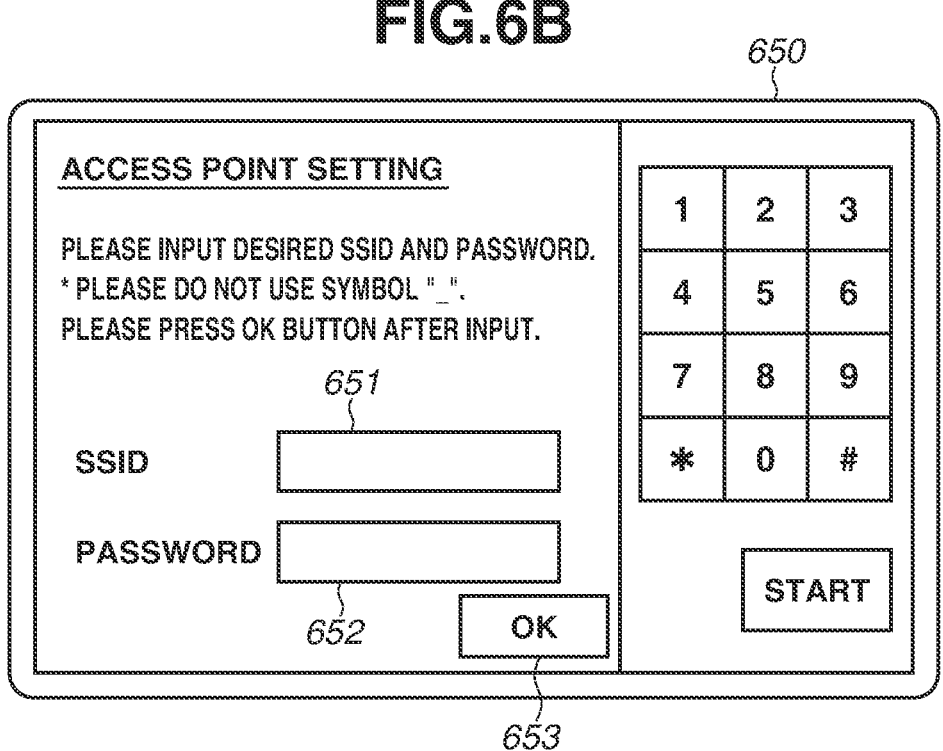

FIG. 6A is a diagram of a wireless direct connection start screen displayed on the image forming apparatus, and FIG. 6B is a diagram of an access point setting screen displayed on the image forming apparatus.

Figure 7A:
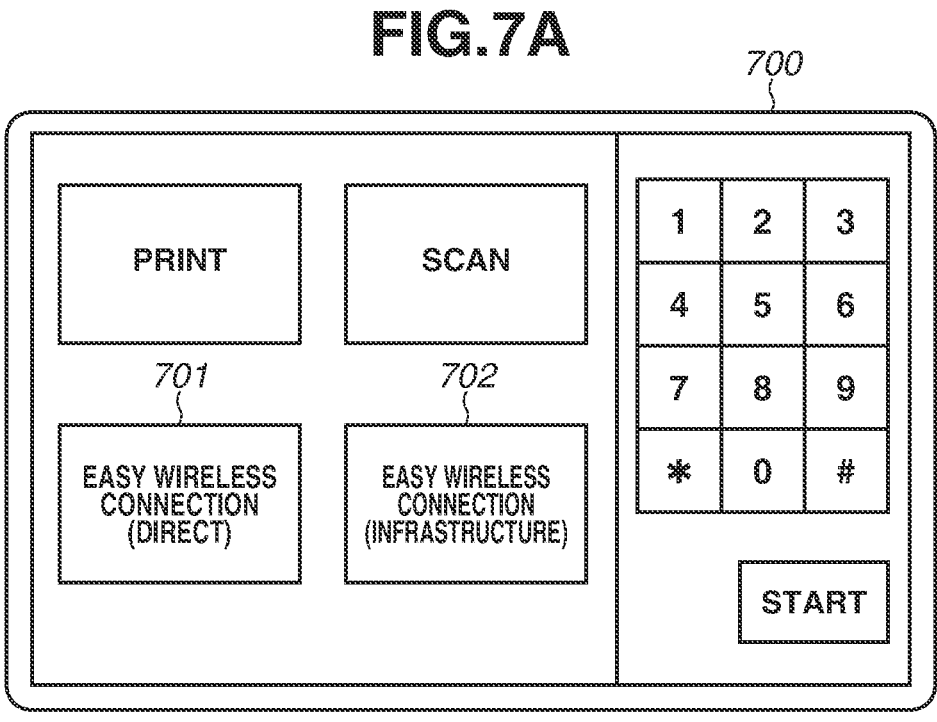
Figure 7B:
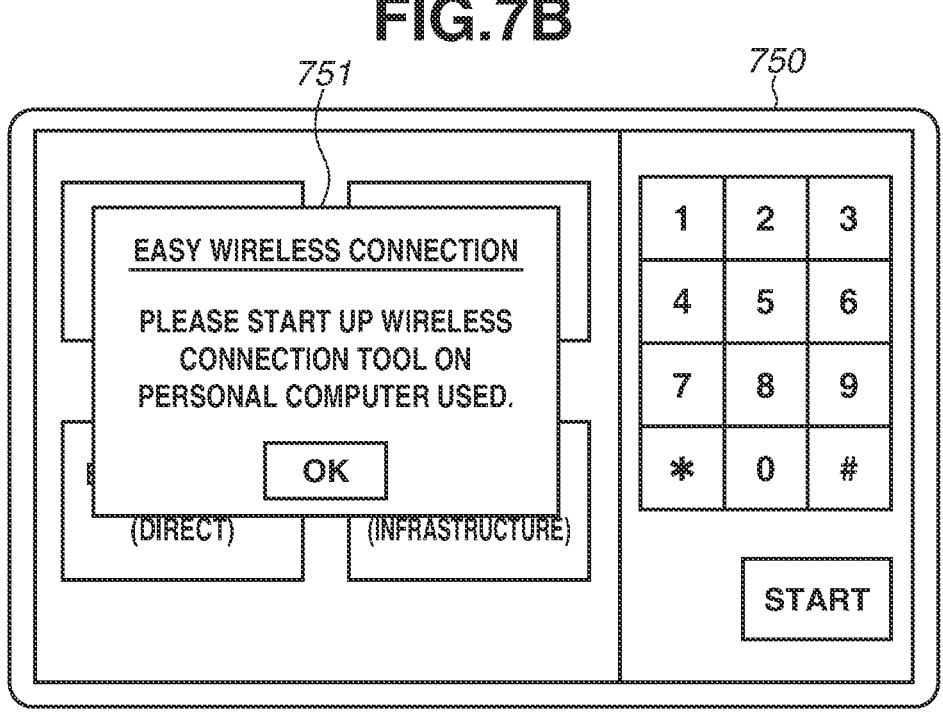

FIG. 7A is a diagram of a menu screen displayed on the image forming apparatus, and FIG. 7B is a diagram of a notification screen displayed on the image forming apparatus.

Figure 8:
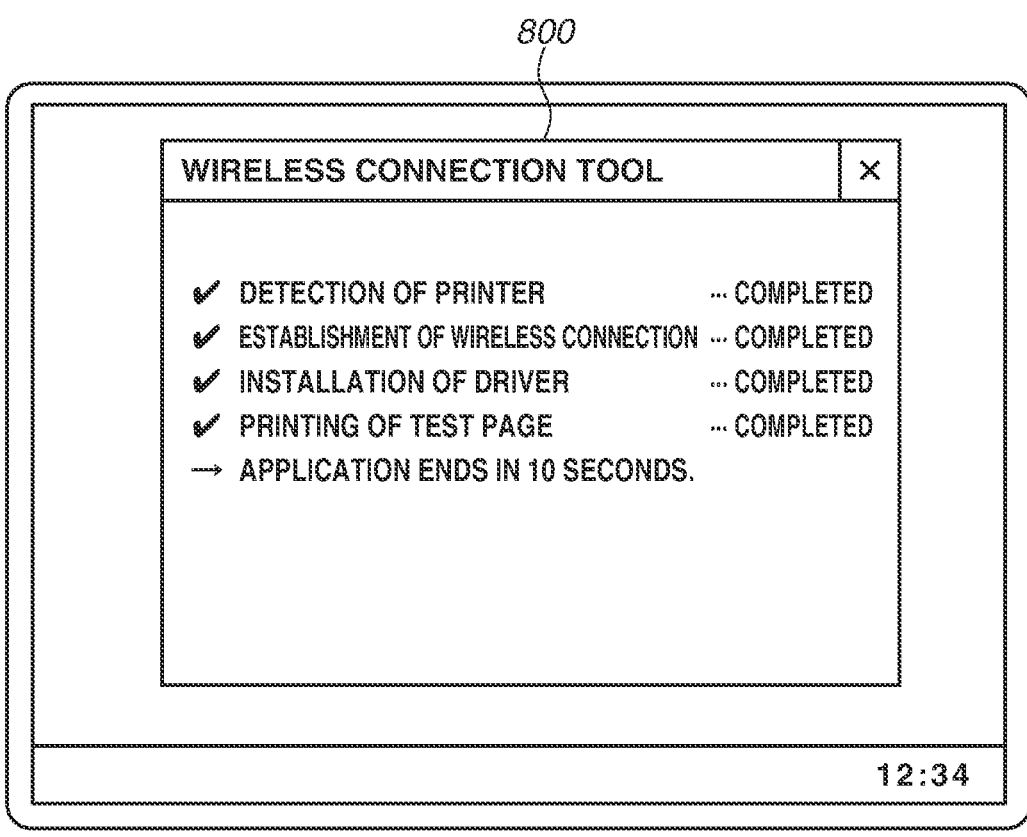

FIG. 8 is a diagram illustrating a display screen of a wireless connection tool displayed on the information processing apparatus.

Figure 9:
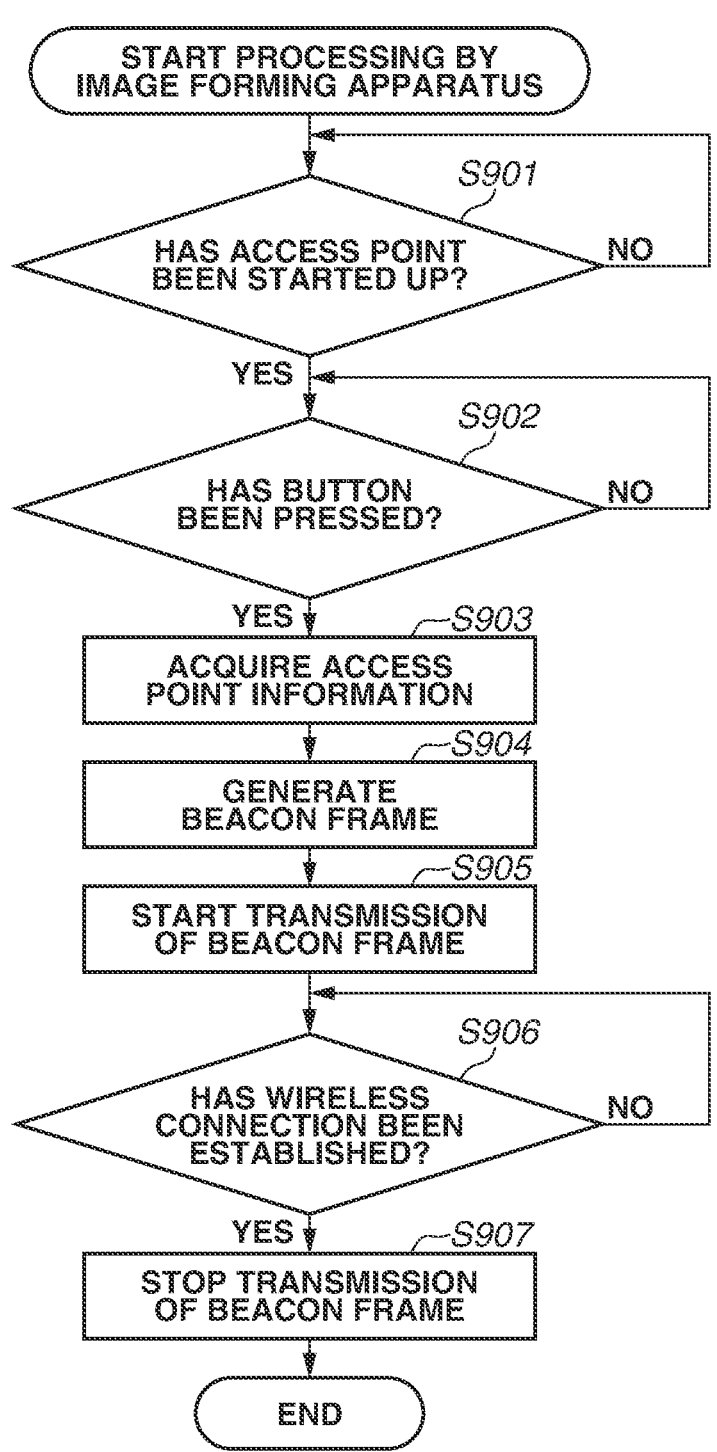

FIG. 9 is a diagram illustrating a processing flow in the image forming apparatus.

Figure 10:
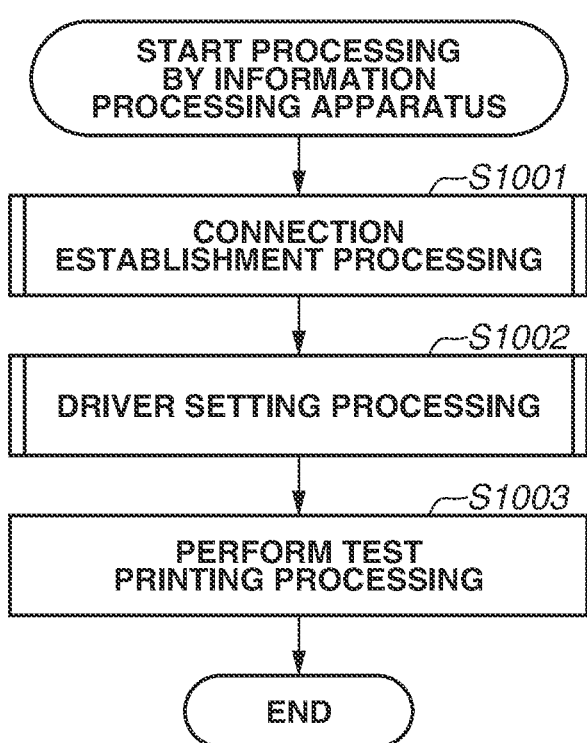

FIG. 10 is a diagram illustrating a processing flow in the information processing apparatus.

Figure 11:
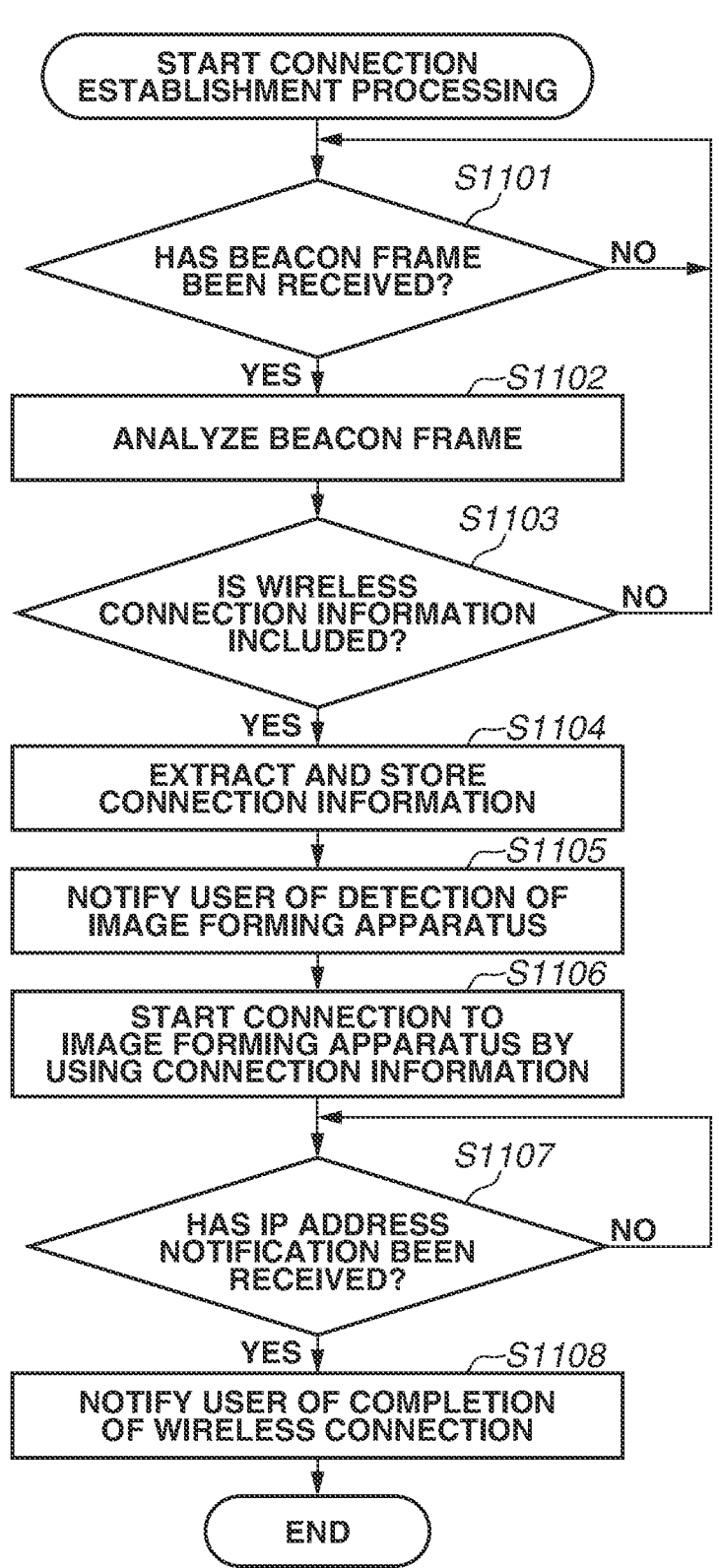

FIG. 11 is a diagram illustrating a detailed flow of connection establishment processing in the information processing apparatus.

Figure 12:
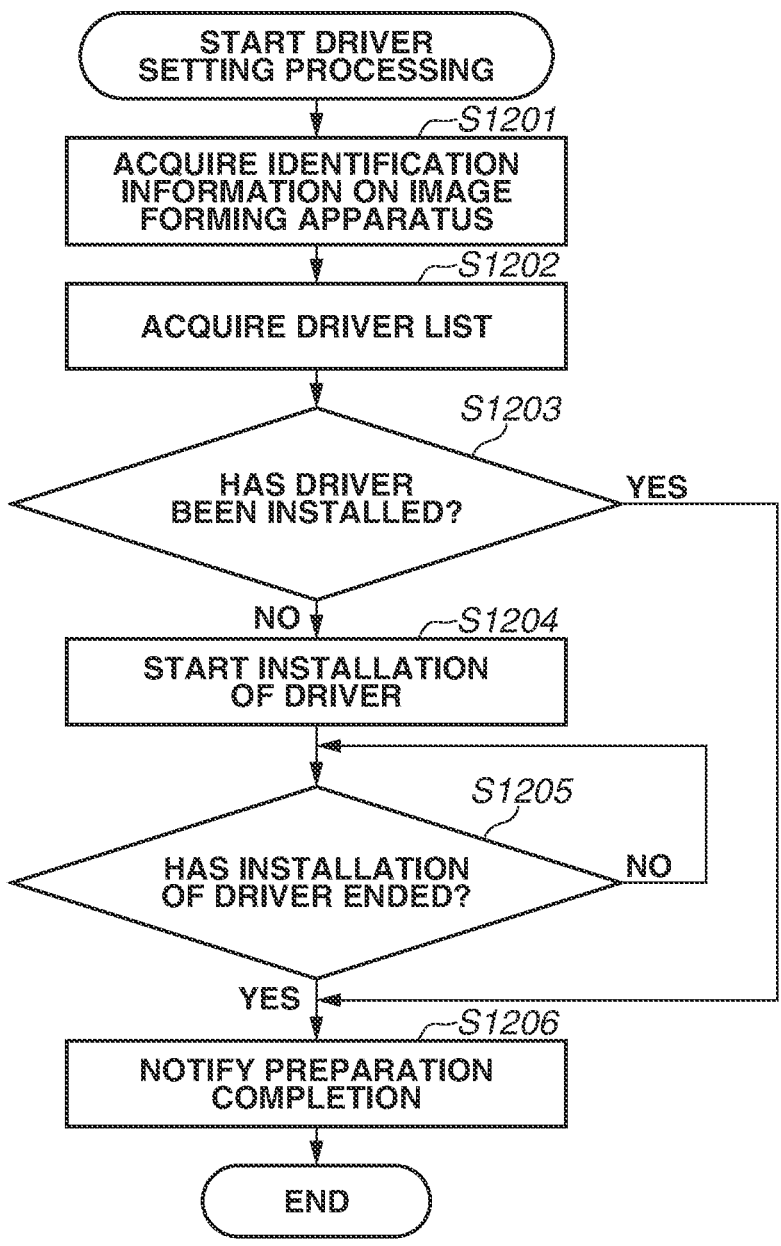

FIG. 12 is a diagram illustrating a detailed flow of driver setting processing in the information processing apparatus.

Figure 13:
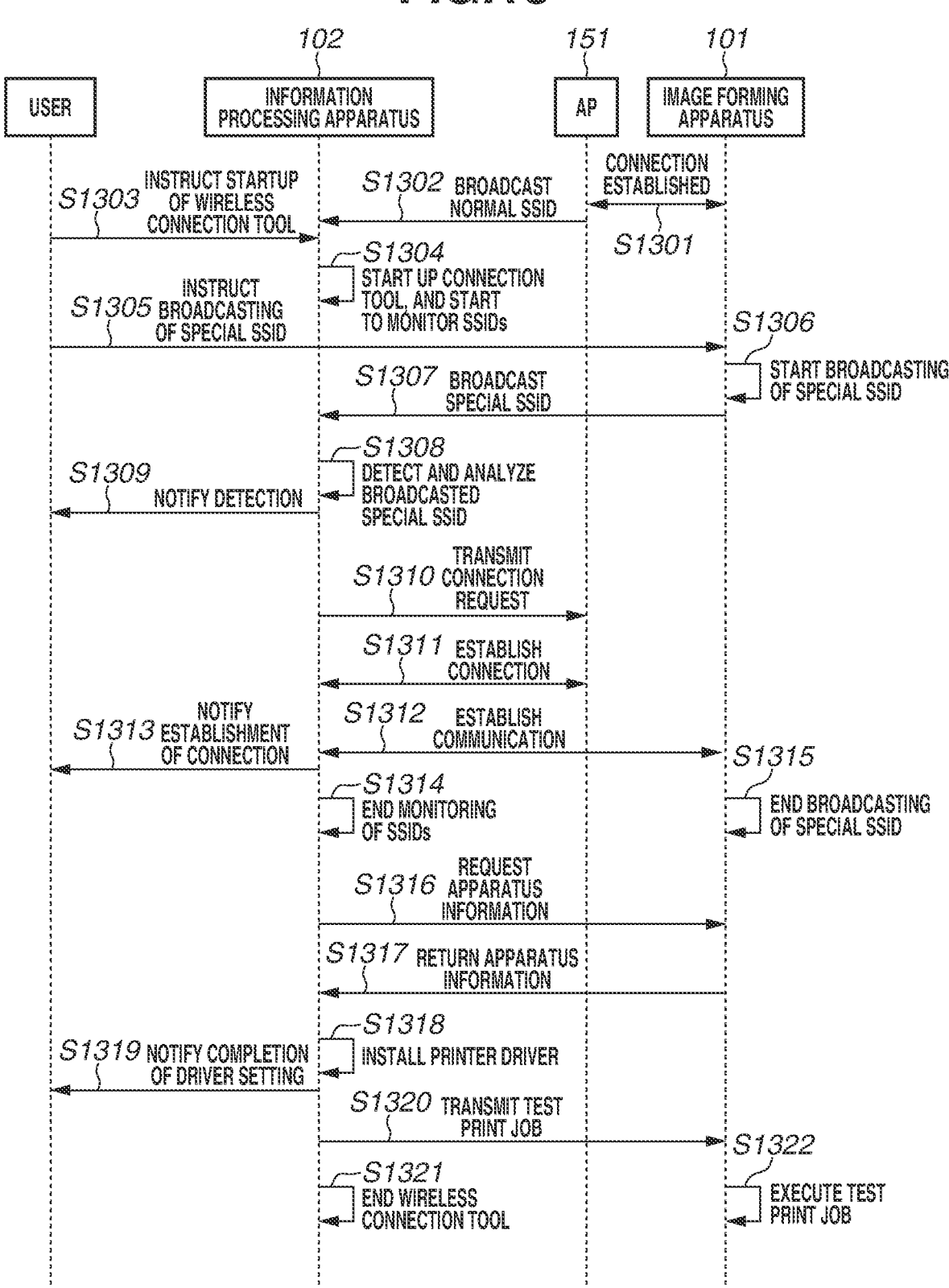

FIG. 13 is a diagram illustrating a usage sequence of the system according to the second exemplary embodiment.

DESCRIPTION OF THE EMBODIMENTS

Exemplary embodiments of the present disclosure will be described in detail below with reference to drawings. The exemplary embodiments described below do not limit the disclosure according to the claims, and all of combinations of configurations and steps described in the exemplary embodiments are not necessarily essential for solving means of the disclosure. A part or all of the configurations and steps described in the exemplary embodiments may be replaced with equivalents. Further, the configurations and steps may be partially omitted.

<System>

Figures 1A, 1B:
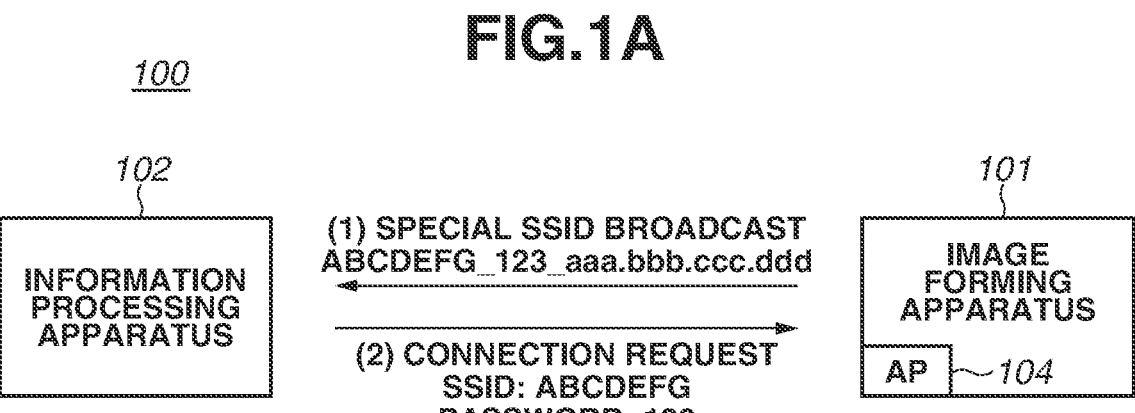
FIG. 1A is a diagram illustrating a state of a system according to a first exemplary embodiment.
FIG. 1B is a diagram illustrating a state of a system according to a second exemplary embodiment.

FIG. 1A is a block diagram illustrating an entire configuration of a system according to a first exemplary embodiment. A communication system 100 includes an image forming apparatus 101 and an information processing apparatus 102. The image forming apparatus 101 functions as (provides) an access point (AP) 104 by a software access point function or a role as a master of direct connection. In the system 100, the access point 104 broadcasts a special service set identifier (SSID). In contrast, the information processing apparatus 102 analyzes and uses the special SSID for a connection request. Wireless direct connection between the information processing apparatus 102 and the image forming apparatus 101 is established by the connection request. Establishment of the wireless direct connection enables the information processing apparatus 102 to transmit/receive data to/from the image forming apparatus 101.

FIG. 4 is a diagram illustrating a usage sequence of the system according to the first exemplary embodiment. A state where a user uses the system 100 will be described with reference to FIG. 4.

In step S401, the user instructs the image forming apparatus 101 to perform setting and startup of the access point 104.

In step S402, the image forming apparatus 101 starts up the access point 104.

In step S403, the image forming apparatus 101 is put into a state of broadcasting a normal SSID as a result of startup of the access point 104.

In step S404, the user instructs the information processing apparatus 102 to start up a wireless connection tool.

In step S405, the information processing apparatus 102 starts up the wireless connection tool, and starts monitoring of SSIDs broadcasted to surroundings.

In step S406, the user instructs the image forming apparatus 101 to broadcast the special SSID.

In step S407, the image forming apparatus 101 starts broadcasting of the special SSID based on set contents of the access point 104.

In step S408, the image forming apparatus 101 broadcasts the special SSID.

In step S409, the information processing apparatus 102 detects the special SSID from the SSIDs broadcasted to surroundings.

In step S410, the information processing apparatus 102 notifies the user of acquisition of connection information (detection of image forming apparatus).

In step S411, the information processing apparatus 102 transmits a connection request to the image forming apparatus 101 specified based on the connection information.

In step S412, the image forming apparatus 101 and the information processing apparatus 102 establish wireless direct connection.

In step S413, the information processing apparatus 102 notifies the user of success of connection establishment.

In step S414, the information processing apparatus 102 ends monitoring of the SSIDs.

In step S415, the image forming apparatus 101 ends broadcasting of the special SSID.

In step S416, the information processing apparatus 102 requests apparatus information to the image forming apparatus 101 via the wireless direct connection.

In step S417, the image forming apparatus 101 returns the apparatus information to the information processing apparatus 102 via the wireless direct connection.

In step S418, the information processing apparatus 102 installs a printer driver corresponding to the image forming apparatus 101.

In step S419, the information processing apparatus 102 notifies the user of completion of driver setting.

In step S420, the information processing apparatus 102 transmits a test print job to the image forming apparatus 101.

In step S421, the information processing apparatus 102 ends the wireless connection tool.

In step S422, the image forming apparatus 101 executes the test print job.

As described above, in the system, the wireless direct connection between the image forming apparatus 101 and the information processing apparatus 102 can be easily performed. Further, installation of the printer driver and initial setting of the test print job and the like can be achieved by a small number of operation steps.

<Configuration of Image Forming Apparatus>

Figure 2A:
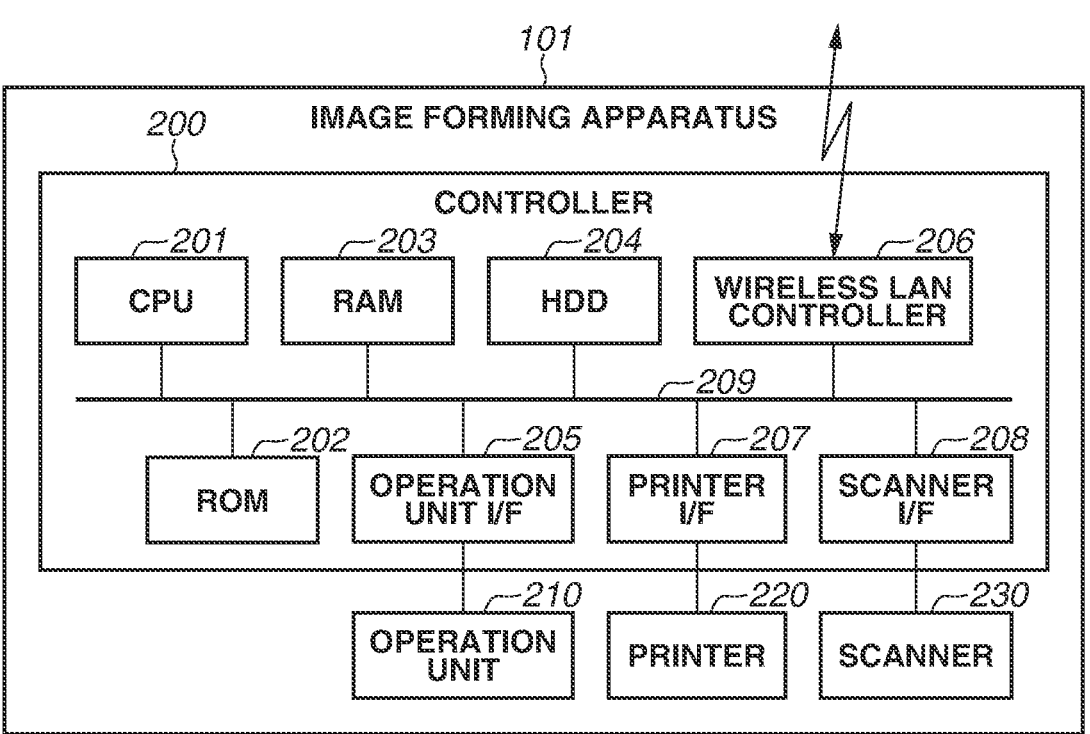
FIG. 2A is a block diagram illustrating a hardware configuration of an image forming apparatus.

FIG. 2A is a block diagram illustrating a hardware configuration of an image forming apparatus.

The image forming apparatus 101 is a communication apparatus (image processing apparatus) that can communicate with the information processing apparatus 102. As illustrated in the block diagram of FIG. 2A, the image forming apparatus 101 includes a controller 200, an operation unit 210, a printer 220, and a scanner 230.

The operation unit 210 includes a display as a display unit that displays image data and system information. The operation unit 210 further includes a touch panel sensor and hardware keys as an input unit receiving operation by the user.

The printer 220 is an image forming unit that forms an image on a sheet. An image forming method of the image forming unit may be an electrophotographic method or an inkjet method.

The scanner 230 is a read unit that reads an image from a document.

The controller 200 is a control unit that controls entire operation of the image forming apparatus 101. The controller 200 includes a central processing unit (CPU) 201, a read only memory (ROM) 202, a random access memory (RAM) 203, a hard disk drive (HDD) 204, an operation unit interface (I/F) 205, a wireless local area network (LAN) controller 206, a printer I/F 207, and a scanner I/F 208. The devices are connected so as to be communicable via a bus 209. The controller 200 includes the CPU 201, the ROM 202 (or HDD 204), and the RAM 203 as a basic configuration, and performs various control using various kinds of interfaces and circuits.

The CPU 201 is a processor performing various kinds of control by executing programs. The CPU 201 loads firmware and control programs stored in the ROM 202 or the HDD 204 to the RAM 203, and executes the firmware and the control programs. The CPU 201 implements various functions by communicating with each of the devices connected to the bus 209.

The ROM 202 is a memory that stores information. The ROM 202 stores the control programs and the firmware for starting up the CPU 201.

The RAM 203 is a system work memory for operation of the CPU 201. The RAM 203 also functions as a memory that temporarily stores image data. The RAM 203 includes a static RAM (SRAM) and a dynamic RAM (DRAM).

The HDD 204 is a storage medium that stores system software and image data. The HDD 204 further stores an SSID and a password necessary for connection to the access point 104 of the image forming apparatus 101. FIG. 5A is a diagram illustrating an example of connection information. A connection information list 500 includes an access point information column 501, an SSID information column 502, a password information column 503, and an Internet protocol (IP) address information column 504. The access point information column 501 stores type information on each access point. The SSID information column 502 stores an SSID which is connection information for connection to each access point. The password information column 503 stores a password corresponding to each SSID. The IP address information column 504 stores IP address information necessary to specify the image forming apparatus 101 at the time of accessing the image forming apparatus 101 from outside.

The operation unit I/F 205 controls input from the operation unit 210 and output to the operation unit 210.

The wireless LAN controller 206 can be connected to an external apparatus and the LAN by wireless communication, and can transmit/receive data. At this time, the wireless LAN controller 206 transmits/receives data by being connected to the external information processing apparatus 102 via the access point 104 inside the image forming apparatus 101. The wireless LAN controller 206 supports wireless communication of an Institute of Electrical and Electronics Engineers (IEEE) 802.11 standard.

The printer I/F 207 performs processing such as color conversion, filter processing, and resolution conversion on printer output image data to be output to the printer 220.

The scanner I/F 208 performs processing such as correction processing, modification processing, and editing on input image data read out from the scanner 230.

Figure 2B:
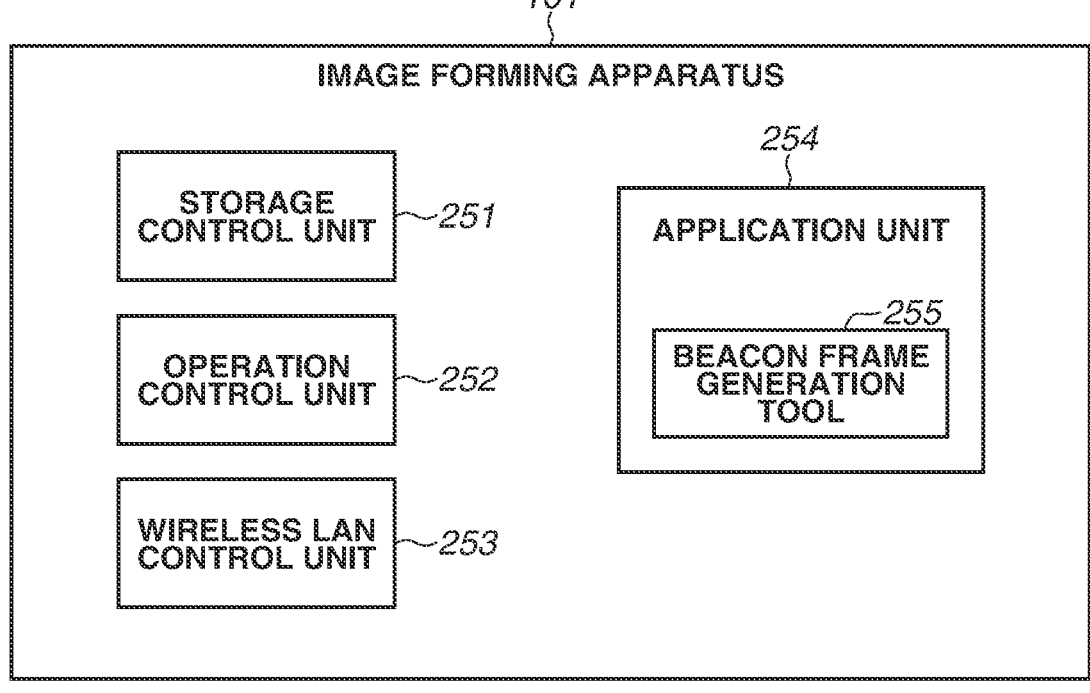
FIG. 2B is a block diagram illustrating a software configuration of the image forming apparatus.

When the controller 200 executes various programs, various functions as illustrated in FIG. 2B are implemented. FIG. 2B is a block diagram illustrating a software configuration of the image forming apparatus.

A storage control unit 251 reads/writes various kinds of data from/to the ROM 202, the RAM 203, and the HDD 204 of the image forming apparatus 101 in response to instructions from the other control units.

An operation control unit 252 controls operation of the operation unit 210. The operation control unit 252 displays an operation screen and system information on the operation unit 210, and notifies the other control units of an input instruction by user operation.

A wireless LAN control unit 253 controls wireless LAN communication and wireless direct communication executed by the wireless LAN controller 206.

An application unit 254 includes a plurality of applications inside the image forming apparatus 101. In the present exemplary embodiment, a beacon frame generation tool 255 is included as one of the applications. A beacon frame 550 is a frame complying with the IEEE 802.11 standard. Further, the beacon frame 550 is a management frame periodically broadcasted from a wireless LAN access point, and includes information on the access point itself. The user using a neighboring access point detects presence of the access point by collecting the beacon frame. A frame body 551 inside the beacon frame (management frame) 550 includes an SSID field 552 indicating an identifier of the access point. The beacon frame generation tool 225 includes a function of generating the beacon frame 550 and a function of broadcasting the beacon frame 550.

<Configuration of Information Processing Apparatus>

Figure 3A:
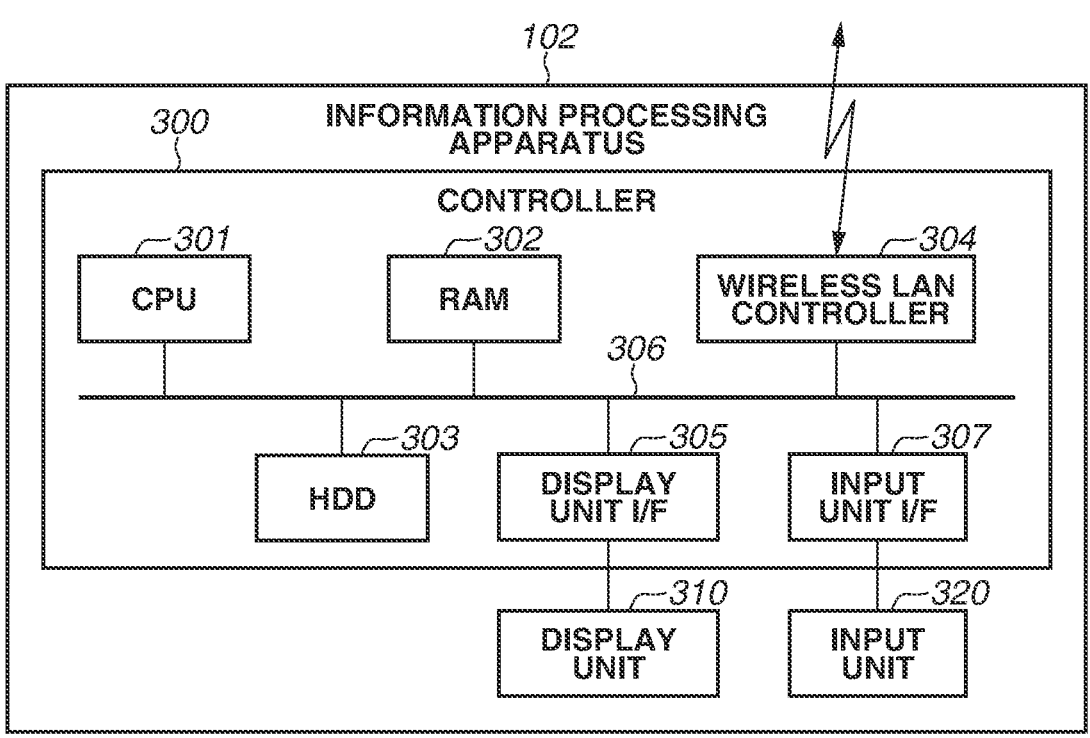
FIG. 3A is a block diagram illustrating a hardware configuration of an information processing apparatus, and FIG.

FIG. 3A is a block diagram illustrating a hardware configuration of the information processing apparatus.

The information processing apparatus 102 is a communication terminal that communicates and cooperates with the image forming apparatus 101. As illustrated in the block diagram of FIG. 3A, the information processing apparatus 102 includes a controller 300, a display unit 310, and an input unit 320.

The display unit 310 is a display that displays information, such as a liquid crystal panel.

The input unit 320 is a user interface that receives input operation by the user.

Examples of the input unit include a keyboard, a mouse, and a touch panel sensor.

The controller 300 is a control unit that controls entire operation of the information processing apparatus 102. The controller 300 includes a CPU 301, a RAM 302, an HDD 303, a wireless LAN controller 304, a display unit I/F 305, and an input unit I/F 307. The devices are connected so as to be communicable via a bus 306. The controller 300 includes the CPU 301, the HDD 303, and the RAM 302 as a basic configuration, and performs various control using various interfaces and circuits.

The CPU 301 controls entire operation of the information processing apparatus 102 by controlling each of the devices connected to the bus 306 based on an operating system (OS) and control programs stored in the HDD 303.

The CPU 301 is a processor performing various kinds of control by executing programs represented by the OS. The CPU 301 develops firmware and control programs stored in the HDD 303 to the RAM 302, and executes the firmware and the control programs. The CPU 301 realizes various functions by communicating with each of the devices connected to the bus 306.

The RAM 302 is a system work memory for operation of the CPU 301, and is also a memory that temporarily stores image data.

The HDD 303 is a storage medium storing the OS, the control programs, and image data.

The wireless LAN controller 304 is a communication interface that can be connected to an external apparatus and the LAN by the wireless communication, and can transmit/receive data by the wireless communication. The wireless LAN controller 304 supports the wireless communication of the IEEE802.11 standard.

Figure 3B:
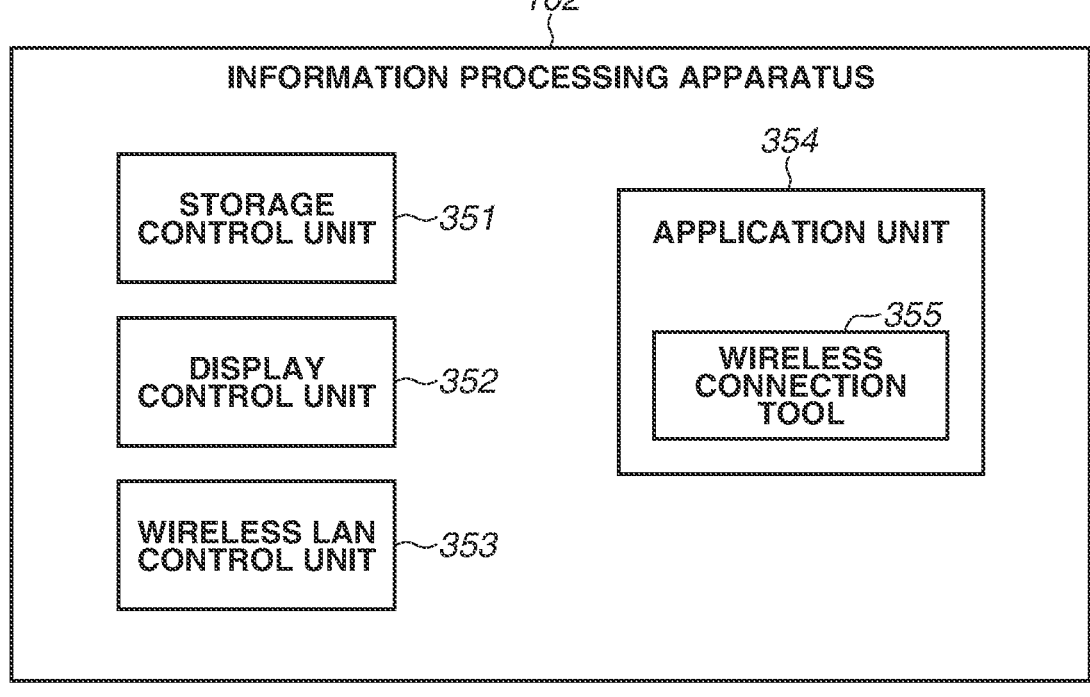

When the controller 300 executes various programs, various functions as illustrated in FIG. 3B are implemented. FIG. 3B is a block diagram illustrating a software configuration of the information processing apparatus.

A storage control unit 351 reads/writes various kinds of data from/to the RAM 302 and the HDD 303 of the information processing apparatus 102 in response to instructions from the other control units.

A display control unit 352 controls operation of the display unit 310. The display control unit 352 displays a display screen and system information on the display unit 310.

A wireless LAN control unit 353 controls wireless LAN communication and wireless direct communication executed by the wireless LAN controller 304.

An application unit 354 includes a plurality of applications inside the information processing apparatus 102. A wireless connection tool 355 is included as one of the applications. The wireless connection tool 355 includes a function of monitoring a broadcast packet, a function of acquiring connection information, and a function of starting wireless connection based on the connection information. Accordingly, the wireless connection tool 355 constantly grasps a communication state of the wireless LAN controller 304 of the information processing apparatus 102, and can monitor an incoming state of a packet and transmit/receive a packet.

<Description of Broadcasting of Special SSID>

Broadcasting of the special SSID by the image forming apparatus 101 will be described. The image forming apparatus 101 includes the function of broadcasting the beacon frame 550 in order to notify peripheral apparatuses of wireless connection information.

Prior to use of the above-described function, a wireless direct connection function is started up. FIG. 6A is a diagram of a wireless direct connection start screen displayed on the image forming apparatus. The image forming apparatus 101 displays a wireless direct connection start screen 600 on the display of the operation unit 210. In the wireless direct connection start screen 600, a set SSID, a set password, a startup button 602, and a setting button 601 are arranged. When the startup button 602 is pressed, a software access point is started up, and broadcasting of a normal SSID is started. In the broadcasting of the normal SSID, the set SSID is broadcasted as it is. Setting of the SSID and the password are changeable. When the setting button 601 is pressed, the screen shifts to a setting screen 650.

In the setting screen 650, an SSID field 651, a password field 652, an OK button 653, and a caution message for setting are arranged. In the present exemplary embodiment, a message indicating that a symbol "_" should not be used is displayed. This is because the symbol "_" is used as information to identify the special SSID. When new setting information is input in the SSID field 651 and the password field 652, and the OK button 653 is then pressed, the connection information for the wireless direct connection is updated. As the SSID and the password to be set, character strings uniquely determined for each image forming apparatus may be previously set.

In a state where the wireless direct connection function is started up, an easy wireless connection button 701 becomes pressable in a menu screen 700. FIG. 7A is a diagram of the menu screen displayed on the image forming apparatus. When the easy wireless connection button 701 is pressed, the SSID to be broadcasted from the image forming apparatus 101 is switched from the normal SSID to the special SSID illustrated in FIG. 5B. More specifically, a character string obtained by combining the set SSID (e.g., ABCDEFG), the password (e.g., 123), the IP address (e.g., aaa.bbb.ccc.ddd), and a separator "_(e.g., underscore)" is stored in the SSID field 552.

The normal SSID and the special SSID may be broadcasted in a time-division manner. Further, when the easy wireless connection button 701 is pressed, a notification screen 750 is displayed. FIG. 7B is a diagram of the notification screen displayed on the image forming apparatus. The notification screen 750 includes notification information 751. The notification information 751 notifies the user that the wireless connection tool should be started up on a personal computer.

The processing relating to broadcasting of the special SSID is performed by the beacon frame generation tool 255. FIG. 9 is a diagram illustrating a processing flow in the image forming apparatus. Operation of the beacon frame generation tool 255 operating on the CPU 201 will be described with reference to a flowchart illustrated in FIG. 9.

In step S901, the beacon frame generation tool 255 checks a startup state of the access point 104 to the wireless LAN control unit 253. In a case where the access point 104 has not been started up (NO in step S901), the processing remains in step S901. In a case where the access point 104 has been started up (YES in step S901), the beacon frame generation tool 255 requests the operation control unit 252 to make the connection button 701 pressable, and the processing proceeds to step S902.

In step S902, the beacon frame generation tool 255 calls the operation control unit 252, and monitors whether the easy wireless connection button 701 on the operation unit 210 has been pressed. In a case where the easy wireless connection button 701 has not been pressed (NO in step S902), the processing remains in step S902. In a case where the easy wireless connection button 701 has been pressed (YES in step S902), the processing proceeds to step S903.

In step S903, the beacon frame generation tool 255 calls the storage control unit 251, and reads out the SSID, the password, and the IP address for connection to the access point 104, from the connection information list 500 in the HDD 204.

In step S904, the beacon frame generation tool 255 continuously uses the storage control unit 251, and generates the beacon frame 550 of the special SSID in the RAM 203 based on the SSID and the password of the access point 104 acquired in step S902. In the present exemplary embodiment, the connection information necessary for connection to the access point 104 is embedded in the SSID field 552, which makes it possible to transmit the connection information to the information processing apparatus 102.

In step S905, the beacon frame generation tool 255 calls the wireless LAN control unit 253, and instructs transmission of the beacon frame generated in the RAM 203. The wireless LAN control unit 253 performs broadcasting by using the wireless LAN controller 206. When the image forming apparatus 101 broadcasts the beacon frame, the information processing apparatus 102 can know the wireless connection information. As a result, a wireless communication connection request is transmitted from the information processing apparatus 102, and a procedure for connection establishment is performed based on the request.

In step S906, the beacon frame generation tool 255 calls the wireless LAN control unit 253, and checks whether the wireless connection has been established. The processing remains in step S906 until the wireless connection is established (NO in step S906). In a case where the wireless connection is established (YES in step S906), the processing proceeds to step S907.

In step S907, the beacon frame generation tool 255 calls the wireless LAN control unit 253, and instructs stopping of the broadcasting of the special SSID. In the present exemplary embodiment, the broadcasting of the special SSID is automatically stopped; however, the user may operate the operation unit 210 to manually stop the broadcasting of the special SSID.

<Processing by Information Processing Apparatus 102>

Each processing by the information processing apparatus 102 will be described. As an initial setting program (application) for cooperation with the image forming apparatus 101, the wireless connection tool 355 is installed in the information processing apparatus 102. The wireless connection tool 355 according to the present exemplary embodiment automatically performs connection to the image forming apparatus 101, installation of a driver, and test printing request.

FIG. 10 is a diagram illustrating a processing flow in the information processing apparatus. Operation of the wireless connection tool 355 operating on the CPU 301 will be described with reference to a flowchart illustrated in FIG. 10.

In step S1001, the wireless connection tool 355 performs connection establishment processing to establish communicable connection with the image forming apparatus 101. Details of the connection establishment processing will be described below.

In step S1002, the wireless connection tool 355 performs processing to install a driver corresponding to the image forming apparatus 101 with which the connection has been established. Details of driver setting processing will be described below.

In step S1003, the wireless connection tool 355 transmits a test print job to the image forming apparatus with which the connection has been established, by using the installed driver.

FIG. 8 is a diagram illustrating a display screen of the wireless connection tool displayed on the information processing apparatus. When the wireless connection tool 355 is started up, a window of a display screen 800 is displayed on the display unit 310 of the information processing apparatus 102. The display screen 800 updates progress about the series of processing automatically performed as necessary, and displays the progress. In the present exemplary embodiment, the progress is displayed on the display screen 800. Alternatively, the progress may be notified by, for example, using a notification function of the OS and displaying a popup window.

The details in step S1001 will be described with reference to FIG. 11. FIG. 11 is a diagram illustrating a detailed flow of the connection establishment processing in the information processing apparatus. Operation of the wireless connection tool 355 operating on the CPU 301 will be described with reference to a flowchart illustrated in FIG. 11.

In step S1101, the wireless connection tool 355 calls the wireless LAN control unit 353, and monitors incoming of the beacon frame 550 to the information processing apparatus 102. In a case where the beacon frame has not been received (NO in step S1101), the processing remains in step S1101. In a case where the beacon frame has been received (YES in step S1101), the processing proceeds to step S1102.

In step S1102, the wireless connection tool 355 analyzes the received beacon frame. For example, the wireless connection tool 355 checks whether information included in the beacon frame 550 can be decomposed into a plurality of pieces of information. More specifically, the wireless connection tool 355 refers to the SSID field 552 in the received beacon frame 550, and checks whether the SSID field 552 is described in a designated format. For example, in a case of the beacon frame 550 as illustrated in FIG. 5B, the character string in the SSID field 552 includes a specific separator (e.g., "_(underscore)"). Therefore, the wireless connection tool 355 checks whether the character string can be divided at the separator (e.g., "_(underscore)"). Based on a result of the check, it is determined that the wireless connection information such as the SSID, the password, and the IP address can be acquired.

In a case where the wireless connection tool 355 determines that the SSID and the password are included (YES in step S1103), the processing proceeds to step S1104. Otherwise (NO in step S1103), the processing returns to step S1101.

In step S1104, the wireless connection tool 355 calls the storage control unit 351, extracts the SSID, the password, and the IP address from the SSID field 552, and stores the acquired various kinds of information in the HDD 303. In the case of the beacon frame 550 as illustrated in FIG. 5B, the information can be divided into three pieces of information at the separators. The first information is the SSID, the second information is the password, and the third information is the IP address.

In step S1105, the wireless connection tool 355 calls the display control unit 352, and notifies the user of reception of the beacon frame 550 including the wireless LAN connection information.

In step S1106, the wireless connection tool 355 calls the wireless LAN control unit 353, and requests the wireless connection to the image forming apparatus 101 by using the SSID and the password stored in the HDD 303. The wireless LAN control unit 253 of the image forming apparatus 101 receiving the wireless connection request from the information processing apparatus 102 determines whether the wireless connection request is acceptable. The wireless LAN control unit 253 compares the SSID and the password received by the wireless connection request from the information processing apparatus 102, with the connection information list 500. In a case where the wireless connection request is acceptable, the wireless LAN control unit 253 assigns an IP address to the information processing apparatus that has requested connection, and notifies the information processing apparatus of the IP address.

In step S1107, the wireless connection tool 355 calls the wireless LAN control unit 353, and waits for incoming of a notification of the IP address that is assigned to the information processing apparatus 102 by the image forming apparatus 101. The processing remains in step S1107 until the IP address notification is received (NO in step S1107). In a case where the IP address notification is received (YES in step S1107), the processing proceeds to step S1108.

In step S1108, the wireless connection tool 355 notifies the user of completion of the wireless direct connection with the image forming apparatus 101.

<Description of Installation of Driver in Information Processing Apparatus>

As described in step S1002, to perform printing and scanning in the image forming apparatus 101, the wireless connection tool 355 of the information processing apparatus 102 installs a printer driver. To specify the image forming apparatus 101 from the information processing apparatus 102, the IP address acquired from the beacon frame 550 is used.

FIG. 12 is a diagram illustrating a detailed flow of the driver setting processing in the information processing apparatus.

In step S1201, the wireless connection tool 355 calls the wireless LAN control unit 353, accesses the image forming apparatus 101 specified from the acquired IP address, and acquires identification information of the image forming apparatus 101. The identification information may be a model name or the like of the image forming apparatus 101 as long as the connected model can be determined.

In step S1202, the wireless connection tool 355 calls the storage control unit 351, and reads out a driver list stored in the HDD 303 of the information processing apparatus 102. The driver list manages printer drivers already installed in the information processing apparatus 102, as a list. The driver list is updated every time a driver is installed.

In step S1203, the wireless connection tool 355 checks whether the printer driver corresponding to the connected image forming apparatus 101 has been installed in the information processing apparatus 102 by using the acquired driver list and the acquired model identification information. In a case where the printer driver has already been installed (YES in step S1203), the processing proceeds to step S1206. In a case where the printer driver has not been installed (NO in step S1203), the processing proceeds to step S1204.

In step S1204, the wireless connection tool 355 installs the printer driver in the HDD 303 based on the identification information. The printer driver may be previously stored in the HDD 303, or a uniform resource locator (URL) of a driver acquisition destination may be displayed on the display unit 310 based on the identification information to prompt installation in this step.

In step S1205, the wireless connection tool 355 waits for installation of the driver to end (NO in step S1205). When installation of the driver ends (YES in step S1205), the processing proceeds to step S1206.

In step S1206, the wireless connection tool 355 calls the display control unit 352, and notifies the user that the printer driver has been installed and the image forming apparatus 101 is used.

<Remarks>

As described above, according to the present exemplary embodiment, the beacon frame in which the special SSID and the password are embedded is broadcasted. Therefore, in a case where a program that can analyze the special SSID receives the special SSID, the SSID and the password can be acquired and a connection request can be transmitted.

In the present exemplary embodiment, the method of embedding the wireless connection information in plain text in the SSID field 552 of the beacon frame 550 is described; however, all or a part of the SSID field may be encrypted and transmitted. For example, the image forming apparatus 101 may hold a public key and perform encryption, and the information processing apparatus 102 may hold a private key and perform decryption. Further, in addition to the wireless connection information, additional information such as check digit may be included.

In the present exemplary embodiment, the SSID, the password, and the IP address are included in the SSID field 552 of the beacon frame 550; however, the IP address may not be included and only the SSID and the password may be included in the SSID field 552 of the beacon frame 550.

In the first exemplary embodiment, the configuration to establish the wireless direct connection with the access point 104 inside the image forming apparatus 101 is described. In a second exemplary embodiment, a method in which the image forming apparatus 101 is connected to an external access point 151, and the information processing apparatus 102 is to be connected via the wireless LAN network will be described. The basic configuration in which the image forming apparatus 101 broadcasts the beacon frame to notify the information processing apparatus 102 of the connection information for connection to the access point 151 is similar to the basic configuration in the first exemplary embodiment. The second exemplary embodiment is different from the first exemplary embodiment in that the information embedded in the SSID field 552 of the beacon frame 550 broadcasted by the image forming apparatus 101 is connection information (SSID and password) of the external access point 151. Therefore, configurations similar to the configurations according to the first exemplary embodiment other than the features of the second exemplary embodiment are denoted by similar reference numerals, and detailed descriptions thereof are omitted.

<System Configuration>

FIG. 1B is a block diagram illustrating an entire configuration of a system according to the present exemplary embodiment. A system 150 includes an access point (AP) 151 in addition to the image forming apparatus 101 and the information processing apparatus 102. In the system 150, the image forming apparatus 101 broadcasts a special SSID. In contrast, the information processing apparatus 102 analyzes and uses the special SSID for a connection request to the access point 151. Wireless infrastructure connection between the information processing apparatus 102 and the access point 151 is established by the connection request. After the wireless infrastructure connection is established, the information processing apparatus 102 can transmit/receive data to/from the image forming apparatus 101 by using an IP address acquired through analysis of the special SSID.

FIG. 13 is a diagram illustrating a usage sequence of the system according to the second exemplary embodiment. A state where the user uses the system 150 will be described with reference to FIG. 13.

In step S1301, the connection relationship between the image forming apparatus 101 and the access point 151 has been established. In this case, an example in which the image forming apparatus 101 and the access point 151 are wirelessly connected is described; however, the image forming apparatus 101 and an apparatus including the access point 151 may be connected by a cable of LAN or the like.

In step S1302, the access point 151 broadcasts the own SSID. The SSID is a normal SSID.

In step S1303, the user instructs the information processing apparatus 102 to start up the wireless connection tool.

In step S1304, the information processing apparatus 102 starts up the wireless connection tool, and starts monitoring of SSIDs broadcasted to surroundings.

In step S1305, the user instructs the image forming apparatus 101 to broadcast the special SSID.

In step S1306, the image forming apparatus 101 acquires the SSID and the password for connection to the access point 151, and starts broadcasting of the special SSID based on the information.

In step S1307, the image forming apparatus 101 broadcasts the special SSID.

In step S1308, the information processing apparatus 102 detects the special SSID from the SSIDs broadcasted to surroundings.

In step S1309, the information processing apparatus 102 notifies the user of acquisition of connection information.

In step S1310, the information processing apparatus 102 transmits a connection request to the access point 151 specified based on the connection information.

In step S1311, the information processing apparatus 102 and the access point 151 establish wireless LAN connection.

In step S1312, the information processing apparatus 102 accesses the image forming apparatus 101 by using the IP address acquired from the SSID, via the access point 151.

In step S1313, the information processing apparatus 102 notifies the user of success of connection establishment.

In step S1314, the information processing apparatus 102 ends monitoring of the SSIDs.

In step S1315, the image forming apparatus 101 ends broadcasting of the special SSID.

In step S1316, the information processing apparatus 102 communicates with the image forming apparatus 101 via wireless infrastructure connection, and requests apparatus information.

In step S1317, the image forming apparatus 101 returns the apparatus information to the information processing apparatus 102 via the wireless infrastructure connection.

In step S1318, the information processing apparatus 102 installs a printer driver corresponding to the image forming apparatus 101.

In step S1319, the information processing apparatus 102 notifies the user of completion of driver setting.

In step S1320, the information processing apparatus 102 transmits a test print job to the image forming apparatus 101.

In step S1321, the information processing apparatus 102 ends the wireless connection tool.

In step S1322, the image forming apparatus 101 executes the test print job.

As described above, in the system, the wireless infrastructure connection between the image forming apparatus 101 and the information processing apparatus 102 via the access point 151 can be easily performed. Further, installation of the printer driver and initial setting of the test print job and the like can be realized by a small number of operation steps.

<Processing by Image Forming Apparatus 101>

In a state where the connection with the access point 151 is established, an easy wireless connection button 702 becomes pressable in the menu screen 700. When the easy wireless connection button 702 is pressed, the image forming apparatus 101 starts broadcasting of the special SSID. More specifically, a beacon in which a combination of a plurality of pieces of information is stored in the SSID field 552 is broadcasted. The plurality of pieces of information includes an SSID (e.g., HIJKLMN) used for connection to the access point 151, a password (e.g., 456), an IP address (e.g., eee.fff.ggg.hhh), and a separator "_(e.g., underscore)".

Further, when the easy wireless connection button 702 is pressed, the notification screen 750 is displayed.

FIG. 7B is a diagram of the notification screen displayed on the image forming apparatus. The notification screen 750 includes the notification information 751. The notification information 751 notifies the user that the wireless connection tool should be started up on a personal computer.

The processing by the image forming apparatus 101 is substantially the same as the processing according to the first exemplary embodiment; however, a part of the processing is different in the second exemplary embodiment. For example, in the present exemplary embodiment, in step S901, it is determined whether the image forming apparatus 101 is connected to the access point 151. Further, in step S902, pressing of the button corresponds to pressing of the easy wireless connection button 702. In step S903, acquisition of the access point information is replaced with acquisition of connection information of the access point 151. In the subsequent processing of the second exemplary embodiment, the processing through the internal access point 104 in the first exemplary embodiment is replaced with the processing via the external access point 151.

<Remarks>

According to the present exemplary embodiment, when the easy wireless connection button 702 is pressed, the special SSID based on the connection information on the access point can be broadcasted. As a result, the processing can be performed by replacing connection to the internal access point 104 in the first exemplary embodiment with connection to the external access point 151 as in the second exemplary embodiment.

Other Exemplary Embodiments

The present disclosure can be realized by supplying a program that implements one or more functions of the above-described exemplary embodiments to a system or an apparatus via a network or a storage medium, and causing one or more processors in a computer of the system or the apparatus to read out and execute the program. Further, the present disclosure can be realized by a circuit (e.g., application specific integrated circuits (ASIC)) implementing one or more functions.

Further, the present disclosure may be applied to a system including a plurality of apparatuses or may be applied to a single apparatus. For example, a part of software modules may be executed by an external server, and a result processed by the external server may be acquired to implement a function.

The present disclosure is not limited to the above-described exemplary embodiments. Various modifications (including organic combination of exemplary embodiments) can be made based on the spirit of the present disclosure, and are not excluded from the scope of the present disclosure. In other words, any configurations obtained by combining the above-described exemplary embodiments and the modifications are all included in the present disclosure. For example, the PC is described as an example of the information processing apparatus 102; however, the PC may be replaced with a mobile terminal such as a smartphone. Further, the wireless connection tool may be replaced with a mobile application or the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-043730, filed Mar. 18, 2022, which is hereby incorporated by reference herein in its entirety.

What is claimed is:

1. A communication system, comprising:
an image processing apparatus configured to provide a first access point connectable using a first service set identifier (SSID) and a first password and configured to connect a second access point connectable using a second SSID and a second password,
wherein the image processing apparatus receives selection of a first object or a second object, the first object and the second object being displayed by the image processing apparatus in a state that an object of a print function of the image processing apparatus and an object of a scan function of the image processing apparatus are displayed by the image processing apparatus,
wherein, in a case where the image processing apparatus receives selection of the first object, the image processing apparatus broadcasts a first beacon frame of which an SSID field defined by IEEE 802.11 includes both the first SSID and the first password,
wherein, in a case where the image processing apparatus receives selection of the second object, the image processing apparatus broadcasts a second beacon frame of which an SSID field defined by IEEE 802.11 includes both the second SSID and the second password; and a communication terminal configured to perform wireless direct connection with the image processing apparatus, wherein, in a case where the image processing apparatus broadcasts the first beacon frame, the communication terminal receives the first beacon frame, acquires the first SSID and the first password included in the SSID field, and transmits, using the first SSID and the first password, a connection request to the first access point, wherein, in a case where the image processing apparatus broadcasts the second beacon frame, the communication terminal receives the second beacon frame, acquires the second SSID and the second password included in the SSID field, and transmits, using the second SSID and the second password, a connection request to the second access point.

2. The communication system according to claim 1, wherein the first SSID and the first password included in the SSID field are encrypted.

3. The communication system according to claim 1, wherein the first SSID and the first password included in the SSID field are delimited with a delimiter.

4. The communication system according to claim 1, wherein the image processing apparatus, based on the selection of the first object or the selection of the second object, displays a message prompting a user to start up a wireless connection tool of the communication terminal.

5. The communication system according to claim 1, wherein the image processing apparatus is a printer.

6. The communication system according to claim 1, wherein the image processing apparatus is a scanner.

7. The communication system according to claim 1, wherein the communication terminal is a personal computer (PC).

8. The communication system according to claim 1, wherein the communication terminal is a mobile terminal.

9. An image processing apparatus providing a first access point connectable using a first service set identifier (SID) and a first password and connecting a second access point connectable using a second SSID and a second password, the image processing apparatus comprising:

a controller that receives selection of a first object or a second object, the first object and the second object being displayed by the image processing apparatus in a state that an object of a print function of the image processing apparatus and an object of a scan function of the image processing apparatus are displayed by the image processing apparatus; and a communicator, wherein, in a case where the image processing apparatus receives selection of the first object, the communicator broadcasts a first beacon frame of which an SSID field defined by IEEE 802.11 includes both the first SSID and the first password, wherein, in a case where the image processing apparatus broadcasts the first beacon frame, a communication terminal receives the first beacon frame, acquires the first SSID and the first password included in the SSID field, and transmits, using the first SSID and the first password, a connection request to the first access point, and wherein, in a case where the image processing apparatus broadcasts the second beacon frame, the communication terminal receives the second beacon frame, acquires the second SSID and the second password included in the SSID field, and transmits, using the second SSID and the second password, a connection request to the second access point.

* * * * *